United States Patent
Fukai

(10) Patent No.: US 6,550,360 B1
(45) Date of Patent: Apr. 22, 2003

(54) METHOD FOR CHAMFERING THE CAM PLATE OF A SWASH PLATE COMPRESSOR

(76) Inventor: Isamu Fukai, c/o Sanden Corporation 20, Kotobuki-cho, Isesaki-shi, Gunma-ken, 372-8502 (JP)

( * ) Notice: Subject to any disclaimer, the term of this patent is extended or adjusted under 35 U.S.C. 154(b) by 102 days.

(21) Appl. No.: 09/704,798

(22) Filed: Nov. 3, 2000

(30) Foreign Application Priority Data

Nov. 4, 1999 (JP) .......................................... 11-314360

(51) Int. Cl.[7] .............................. B32B 1/00; B32B 5/18
(52) U.S. Cl. ................................ 82/1.11; 82/1.3; 82/47
(58) Field of Search ............................. 82/1.11, 46, 47, 82/113, 112, 118, 173, 1.3, 1.4

(56) References Cited

U.S. PATENT DOCUMENTS

| | | | | |
|---|---|---|---|---|
| 3,885,481 A | * | 5/1975 | Okada et al. ................ | 82/1.11 |
| 4,177,699 A | * | 12/1979 | Dovnar et al. ............... | 409/132 |
| 4,564,914 A | * | 1/1986 | Ballough et al. ........... | 318/572 |
| 4,683,785 A | * | 8/1987 | Perraudin .................... | 82/1.11 |
| 4,870,786 A | * | 10/1989 | Millay et al. ................ | 451/398 |
| 4,901,480 A | * | 2/1990 | Dillon ......................... | 407/118 |

* cited by examiner

*Primary Examiner*—Henry W. H. Tsai
(74) *Attorney, Agent, or Firm*—Baker Botts L.L.P.

(57) ABSTRACT

A method for chamfering the cam plate of a swash plate compressor comprising a cylinder block provided with cylinder bores, pistons inserted into the cylinder bores to be slidable, a driving shaft, a cam plate slantedly fixed to the driving shaft and shoes inserted between the cam plate and pistons, wherein the circumferential surface of the cam plate forms a cylindrical surface extending coaxially with the driving shaft, comprises the steps of rotating the cam plate around an axis inclined relative to the driving shaft, disposing the blade of a cutting tool to extend parallel to the axis, and abutting the blade of the cutting tool against edges of the circumferential surface of the cam plate.

4 Claims, 3 Drawing Sheets

METHOD FOR CHAMFERING THE CAM PLATE OF A SWASH PLATE COMPRESSOR

BACKGROUND OF THE INVENTION

The present invention relates to a method for chamfering the cam plate of a swash plate compressor.

There has been widely used a swash plate compressor, which as shown in FIG. 1, comprises a cylinder block 1 provided with cylinder bores 2, pistons 3 inserted into the cylinder bores 2 to be slidable, a driving shaft 4, a cam plate 5 slantedly fixed to the driving shaft 4 and shoes, 6 inserted between the cam plate 5 and the pistons 3. The cam plate 5 of the swash plate compressor is ellipsoidal. The circumferential surface 5a of the cam plate 5 forms a cylindrical surface extending coaxially with the driving shaft 4 to avoid interference with the pistons 3.

As seen from FIG. 1, the circumferential surface 5a is present between an acute-angled edge 5a' and an obtuse-angled edge 5a". The acute-angled edge 5a' is closer to the pistons 3 than the obtuse-angled edge 5a" and liable to interfere with the pistons 3. Therefore, the acute-angled edge 5a' must be chamfered.

As shown in FIG. 2, the operation of chamfering the acute-angled edge 5a' has been carried out by a method comprising the steps of rotating the cam plate 5 around a central axis X extending coaxially with the driving shaft 4, abutting the blade 7a of a cutting tool 7 against the acute-angled edge 5a' of the circumferential surface 5a, and reciprocating the cutting tool 7 parallel to the central axis X synchronously with the reciprocal movement of the circumferential surface 5a parallel to the central axis X. As seen from FIG. 2, the blade 7a of the cutting tool 7 must be inclined relative to the central axis X in order to chamfer the acute-angled edge 5a' of the circumferential surface 5a rotating around the central axis X with the cam plate 5 to form a cylindrical surface extending coaxially with the central axis X. The cutting tool 7 with its blade 7a inclined relative to the central axis X must be reciprocated synchronously with the reciprocal movement of the circumferential surface 5a in order to chamfer the acute-angled edge 5a'. Therefore, the conventional method for chamfering the cam plate of the swash plate compressor requires a special apparatus for reciprocating the cutting tool synchronously with the reciprocal movement of the circumferential surface of the cam plate.

As seen from FIG. 2, an acute-angled edge 5a' is present at each side of the cam plate 5. In the conventional method for chamfering, the chamfering of one of the acute-angled edges 5a' of the circumferential surface 5a causes the chamfering of the obtuse-angled edge 5a" connecting with the chamfered acute-angled edge 5a' and not the chamfering of the other of the acute-angled edges 5a'. Therefore, the cutting tool 7 must be abutted against the acute-angled edge 5a' at each side of of the central axis X and from opposite directions in order to chamfer the acute-angled edges 5a' substantially over the whole length thereof. Thus, the conventional method for chamfering requires two chamfering operations.

SUMMARY OF THE INVENTION

An object of the present invention is to provide a method for chamfering the cam plate of a swash plate compressor, wherein a special apparatus for reciprocating the cutting tool synchronously with the reciprocal movement of the circumferential surface of the cam plate is not required and a single chamfering operation can chamfer the acute-angled edges of the circumferential surface over substantially the whole length thereof.

In accordance with the present invention, there is provided a method for chamfering the cam plate of a swash plate compressor comprising a cylinder block provided with cylinder bores, pistons inserted into the cylinder bores to be slidable, a driving shaft, a cam plate slantedly fixed to the driving shaft and shoes inserted between the cam plate and pistons, wherein the circumferential surface of the cam plate forms a cylindrical surface extending coaxially with the driving shaft, comprising the steps of rotating the cam plate around an axis inclined relative to the driving shaft, disposing the blade of a cutting tool to extend parallel to the axis, and abutting the blade of the cutting tool against the edges of the circumferential surface of the cam plate.

In the chamfering method in accordance with the present invention, the cam plate rotates around an axis inclined relative to the driving shaft to incline the circumferential surface of the cam plate forming a cylindrical surface extending coaxially with the driving shaft relative to the axis. Therefore, the edges of the circumferential surface can be chamfered by the steps of disposing the blade of the cutting tool to extend parallel to the axis and abutting the blade against the edges of the circumferential surface. The blade of the cutting tool extends parallel to the axis. Therefore, on the sole condition that the blade of the cutting tool is sufficiently long, the blade of the cutting tool can be kept abutting against the edges of the reciprocating circumferential surface of the cam plate to chamfer the edges even if the cutting tool is fixed in the direction of the reciprocal movement of the circumferential surface of the cam plate. Therefore, the chamfering method in accordance with the present invention does not require a special apparatus for reciprocating[ ]the cutting tool synchronously with the reciprocal movement of the circumferential surface of the cam plate.

In the present chamfering method, a single chamfering operation can chamfer the acute-angled edges of the circumferential surface of the cam plate substantially over their whole length because the blade of the cutting tool can always oppose the acute-angled edges of the circumferential surface of the cam plate.

DETAILED DESCRIPTION OF THE PREFERRED EMBODIMENT

Figure 1:
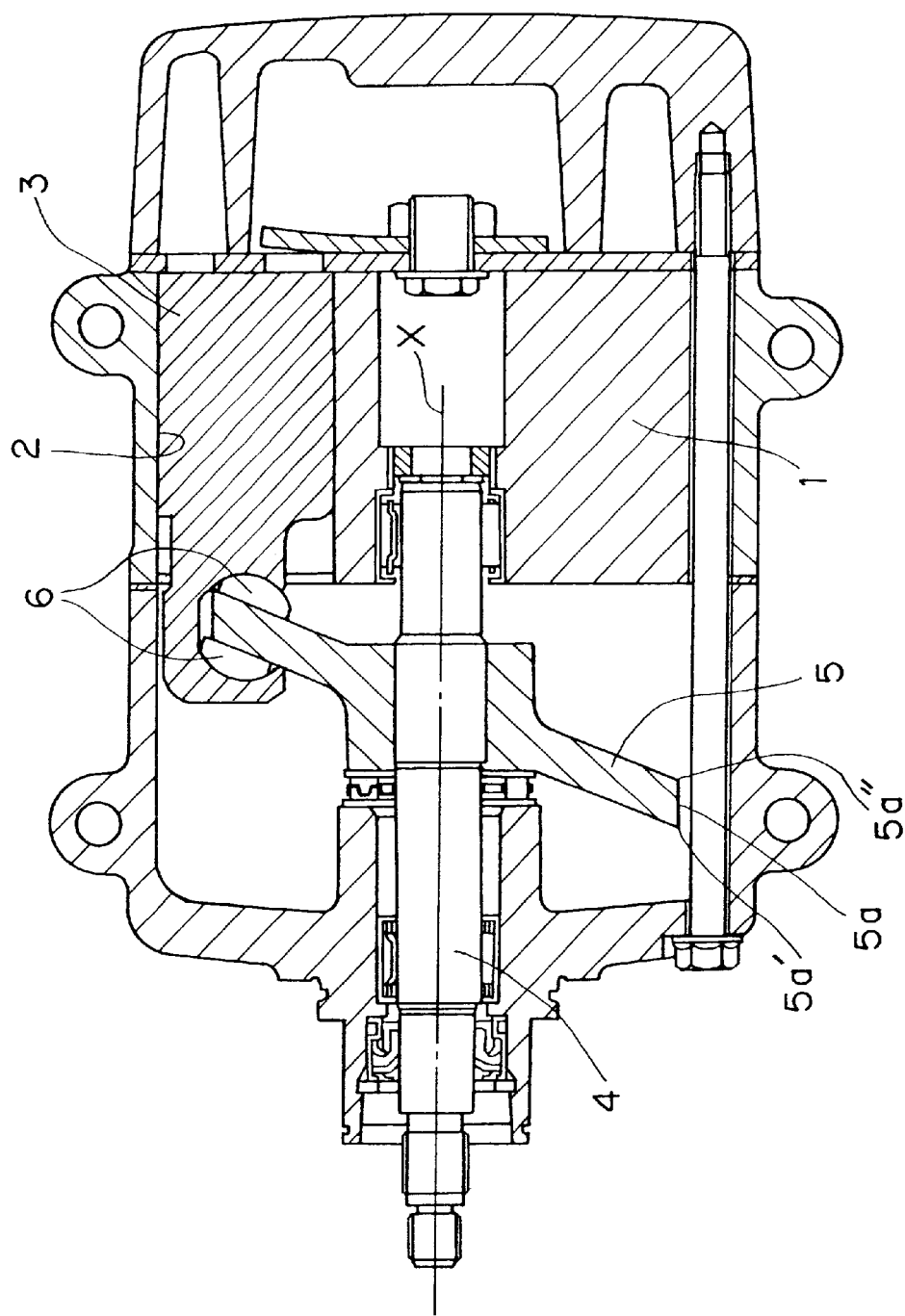
FIG. 1 is a side sectional view of a swash plate compressor.
Figure 2:
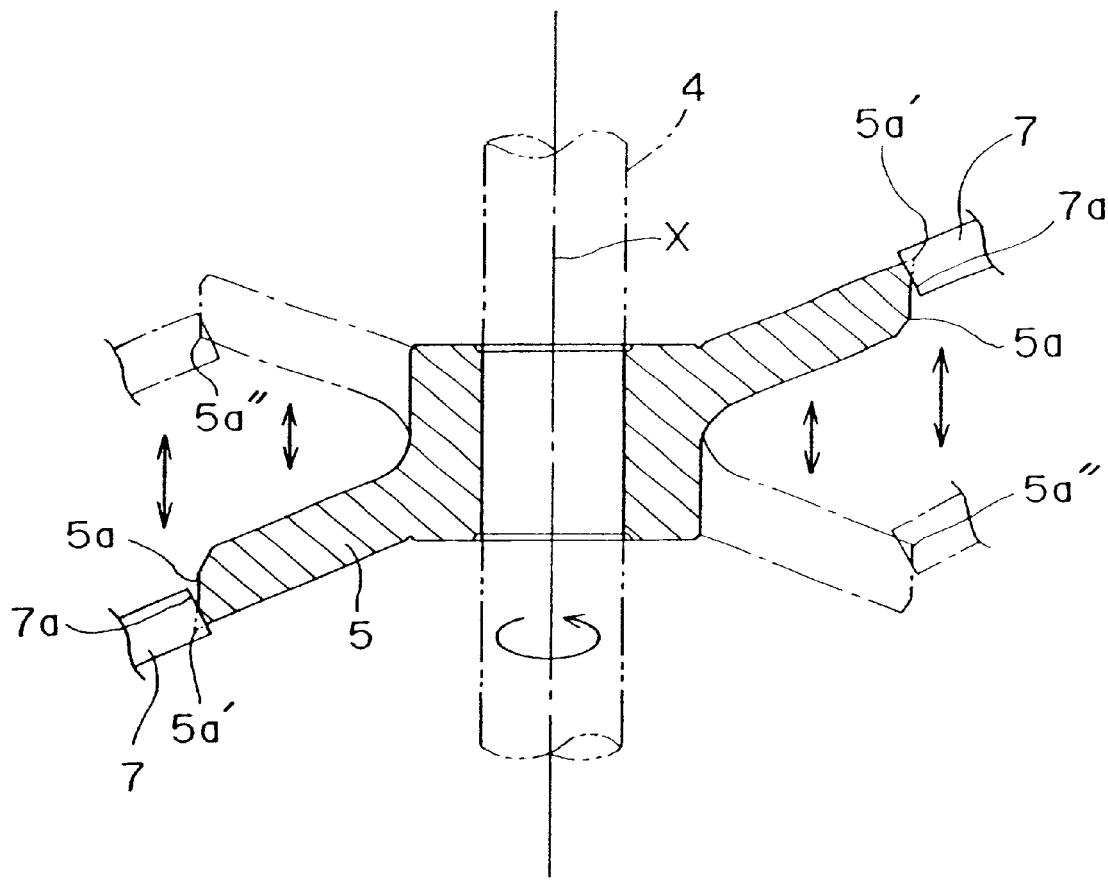
FIG. 2 is a sectional view of a cam plate for explaining the conventional chamfering method of a cam plate.
Figure 3:
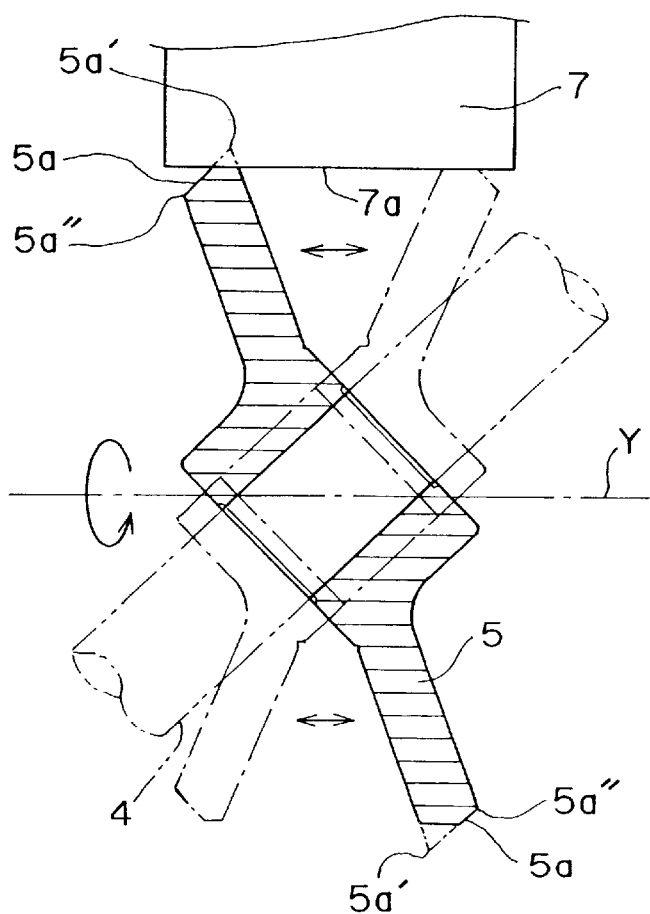
FIG. 3 is a sectional view of a cam plate for explaining the chamfering method of a cam plate in accordance with a preferred embodiment of the present invention.

As shown in FIG. 3, a cam plate 5 is rotated around an axis Y inclined relative to a driving shaft 4, the blade 7a of a cutting tool 7 is disposed to extend parallel to the axis Y, and the blade 7a is abutted against the acute-angled edges 5a' of the circumferential surface 5a of the cam plate 5. The axis Y is directed so that the acute-angled edges 5a' are distanced farther from the axis Y than the obtuse-angled edges 5a".

The cam plate 5 rotates around the axis Y inclined relative to the driving shaft 4 so that the circumferential surface 5a of the cam plate 5 forming a cylindrical surface extending coaxially with the driving shaft 4 is inclined relative to the axis Y. Therefore, the acute-angled edges 5a' of the circumferential surface 5a can be chamfered by the steps of disposing the blade 7a of the cutting tool 7 to extend parallel to the axis Y and abutting the blade 7a against the acute-angled edges 5a'.

The blade 7a of the cutting tool 7 extends parallel to the axis Y. Therefore, on the sole condition that the blade 7a of the cutting tool 7 is sufficiently long, the blade 7a can be kept abutting against the acute-angled edges 5a' of the reciprocating circumferential surface 5a of the cam plate 5 to chamfer the acute-angled edges 5a' even if the cutting tool 7 is fixed in the direction of the reciprocal movement of the circumferential surface 5a of the cam plate 5.

In the chamfering method in accordance with the present embodiment, therefore, no special apparatus is required for reciprocating the cutting tool 7 synchronously with the reciprocal movement of the circumferential surface 5a of the cam plate 5.

In the chamfering method in accordance with the present embodiment, as seen from FIG. 3, the acute-angled edges 5a' distanced farther from the axis Y than the obtuse-angled edges 5a" always oppose the blade 7a of the cutting tool 7 while the cam plate 5 rotates around the axis Y. Therefore, a single chamfering operation can chamfer the acute-angled edges 5a' substantially over their whole length.

The shape of the cam plate 5 is an ellipse as seen parallel to the axis Y because the axis Y is inclined relative to the driving shaft 4. Therefore, the chamfered part of the acute-angled edges 5a' becomes crescent-shaped when the chamfering operation is carried out with the distance between the blade 7a of the cutting tool 7 and the axis Y kept constant. So long as the angle of intersection between the driving shaft 4 and the axis Y and the distance between the blade 7a of the cutting tool 7 and the axis Y are properly determined, the acute-angled edges 5a' can be chamfered substantially over their whole length.

Figure 4:
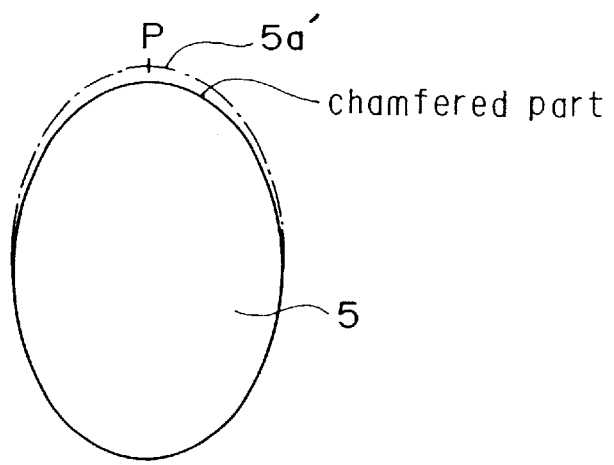
FIG. 4 is a front view of a cam plate chamfered by the chamfering method in accordance with the preferred embodiment of the present invention.

As shown in FIG. 4, the acute-angled edges 5a' are chamfered in crescent shapes extending at the both sides of the top dead centers P of the cam plate 5.

The obtuse-angled edges 5a" can be chamfered by directing the axis Y so that the obtuse-angled edges 5a" are distanced farther from the axis Y than the acute-angled edges 5a'.

While the present invention has been described with reference to a preferred embodiment, one of ordinary skill in the art will recognize that modifications and improvements may be made while remaining within the spirit and scope of the present invention. The scope of the invention is determined solely by the appended claims.

What is claimed is:

1. A method for chamfering the cam plate of a swash plate compressor comprising a cylinder block provided with cylinder bores, pistons inserted into the cylinder bores to be slidable, a driving shaft, a cam plate slantedly fixed to the driving shaft and shoes inserted between the cam plate and pistons, wherein the circumferential surface of the cam plate forms a cylindrical surface extending coaxially with the driving shaft, comprising the steps of rotating the cam plate around an axis inclined relative to the driving shaft, disposing the blade of a cutting tool to extend parallel to the axis, and abutting the blade of the cutting tool against edges of the circumferential surface of the cam plate.

2. A method of claim 1, wherein the blade of the cutting tool is abutted against acute-angled edges of the cam plate, and wherein the acute-angled edges are those edges formed by an intersection of the circumferential surface of the cam plate and an end face of the cam plate such that an internal angle between the circumferential surface of the cam plate and the end face of the cam plate is less than 90°.

3. A cam plate of a swash plate compressor made by the process of claim 1.

4. A cam plate of a swash plate compressor made by the process of claim 2.

* * * * *